(12) United States Patent
Georgy et al.

(10) Patent No.: US 9,797,727 B2
(45) Date of Patent: Oct. 24, 2017

(54) METHOD AND APPARATUS FOR DETERMINATION OF MISALIGNMENT BETWEEN DEVICE AND VESSEL USING ACCELERATION/DECELERATION

(71) Applicant: InvenSense, Inc., San Jose, CA (US)

(72) Inventors: Jacques Georgy, Calgary (CA); Christopher Goodall, Calgary (CA)

(73) Assignee: InvenSense, Inc., San Jose, CA (US)

( * ) Notice: Subject to any disclaimer, the term of this patent is extended or adjusted under 35 U.S.C. 154(b) by 36 days.

(21) Appl. No.: 14/917,894

(22) PCT Filed: Sep. 8, 2014

(86) PCT No.: PCT/CA2014/000669
§ 371 (c)(1),
(2) Date: Mar. 9, 2016

(87) PCT Pub. No.: WO2015/035496
PCT Pub. Date: Mar. 19, 2015

(65) Prior Publication Data
US 2016/0223334 A1 Aug. 4, 2016

Related U.S. Application Data

(60) Provisional application No. 61/878,520, filed on Sep. 16, 2013.

(51) Int. Cl.
*G01S 19/00* (2010.01)
*G01C 21/16* (2006.01)
(Continued)

(52) U.S. Cl.
CPC ........... *G01C 21/16* (2013.01); *G01C 25/005* (2013.01); *G01S 5/0263* (2013.01); *G01S 19/47* (2013.01); *G01S 19/49* (2013.01)

(58) Field of Classification Search
CPC .......... G01S 19/93; G01S 19/49; G01C 21/16
(Continued)

(56) References Cited

U.S. PATENT DOCUMENTS

| 6,532,419 B1 * | 3/2003 | Begin ................ G01C 25/005 701/504 |
| 6,725,173 B2 * | 4/2004 | An ........................ G01V 11/00 244/3.2 |

(Continued)

*Primary Examiner* — Tan Q Nguyen
(74) *Attorney, Agent, or Firm* — Bay Area Technology Law Group PC (57) ABSTRACT

The present disclosure relates to a method and apparatus for determining the misalignment between a device and a platform (such as for example a vessel or vehicle) using acceleration and/or deceleration of the platform, wherein the device can be strapped or non-strapped to the platform, wherein in case of non-strapped the mobility of the device may be constrained or unconstrained within the platform. In case of non-strapped, the device may be moved or tilted to any orientation within the platform and still provide a seamless navigation solution without degrading the performance of this navigation solution. When the device is in a holder in the platform, it is still considered non-strapped, as it may move with respect to the platform. The present method can utilize measurements (readings) from sensors (such as for example, accelerometers, odometer/wheel encoders, gyroscopes, etc.) whether in the presence or in the absence of navigational information updates (such as, for example, Global Navigation Satellite System (GNSS) or WiFi positioning).

36 Claims, 2 Drawing Sheets an exemplary block diagram of the present method (optional routine are showed in dotted lines)

(51) Int. Cl.
G01S 19/47 (2010.01)
G01S 19/49 (2010.01)
G01S 5/02 (2010.01)
G01C 25/00 (2006.01)

(58) Field of Classification Search
USPC .......................................................... 701/541
See application file for complete search history.

(56) References Cited

U.S. PATENT DOCUMENTS

| | | | | |
|---|---|---|---|---|
| 8,086,405 | B2* | 12/2011 | Han | G01C 21/16 |
| | | | | 701/445 |
| 9,228,836 | B2* | 1/2016 | Girod | G01C 15/00 |
| 9,360,323 | B2* | 6/2016 | Grokop | G01C 21/165 |
| 9,581,615 | B2* | 2/2017 | Basir | G01P 21/00 |
| 2008/0114545 | A1* | 5/2008 | Takaoka | G01C 21/28 |
| | | | | 701/526 |
| 2012/0136573 | A1* | 5/2012 | Janardhanan | G01C 21/165 |
| | | | | 701/512 |
| 2012/0245839 | A1* | 9/2012 | Syed | G01C 21/165 |
| | | | | 701/408 |
| 2016/0305782 | A1* | 10/2016 | Al-Hamad | G01C 21/16 |

* cited by examiner

Figure 1

Figure 2
an exemplary block diagram of the present method (optional routine are showed in dotted lines)

METHOD AND APPARATUS FOR DETERMINATION OF MISALIGNMENT BETWEEN DEVICE AND VESSEL USING ACCELERATION/DECELERATION

RELATED APPLICATIONS

This application claims the benefit of U.S. Provisional Patent Application No. 61/878,520, filed on Sep. 16, 2013, which is hereby incorporated by reference in its entirety.

TECHNICAL FIELD

The present disclosure relates to a method and apparatus for determining the misalignment between a device and a platform (such as for example a vessel or vehicle), wherein the device can be strapped or non-strapped to the platform, and wherein in case of non-strapped the mobility of the device may be constrained or unconstrained within the platform.

BACKGROUND

Inertial navigation of a platform is based upon the integration of specific forces and angular rates measured by inertial sensors (e.g. accelerometer, gyroscopes) and a device containing the sensors. In general, the device is positioned within the platform and commonly strapped to the platform. Such measurements from the device may be used to determine the position, velocity and attitude of the device and/or the platform.

The platform may be a motion-capable platform that may be temporarily stationary. Some of the examples of the platforms may be a vehicle or a vessel of any type. The vessel may be land-based, marine or airborne.

Alignment of the inertial sensors within the platform (and with the platform's forward, transversal and vertical axis) is critical for inertial navigation. If the inertial sensors, such as accelerometers and gyroscopes are not exactly aligned with the platform, the positions and attitude calculated using the readings of the inertial sensors will not be representative of the platform. Fixing the inertial sensors within the platform is thus a requirement for navigation systems that provide high accuracy navigation solutions.

For strapped systems, one known means for ensuring optimal navigation solutions is to utilize careful manual mounting of the inertial sensors within the platform. However, portable navigation devices (or navigation-capable devices) are able to move whether constrained or unconstrained within the platform (such as for example a vessel or vehicle), so careful mounting is not an option.

Existing portable navigation devices (or navigation-capable devices) cannot achieve accurate attitude and position of the platform unless at least one of the following three conditions is known:

1) absolute attitude angles for the device and the platform;
2) absolute attitude angles for the device and the misalignment between the device and platform;
3) absolute attitude angles for the platform and the misalignment between the device and platform.

The first above condition needs two assemblies of sensors at least, one on the device and one on the platform, thus knowledge of misalignment is a key factor to enable portable navigation devices without the previously mentioned constraint.

For navigation, mobile/smart phones are becoming very popular as they come equipped with Assisted Global Positioning System (AGPS) chipsets that (in addition to significantly improving the start-up performance by utilizing network connection) further use high sensitivity capabilities to provide absolute positions of the platform even in some environments that cannot guarantee clear line of sight to satellite signals. Deep indoor or challenging outdoor navigation or localization incorporates cell tower ID or, if possible, cell towers trilateration for a position fix where the AGPS solution is unavailable. Despite these two positioning methods that are already present in many mobile devices, accurate indoor localization still presents a challenge and fails to satisfy the accuracy demands of today's location based services (LBS). Additionally, these methods may only provide the absolute heading of the platform without any information on the device's heading.

Many mobile devices, such as mobile phones, are equipped with Micro Electro Mechanical System (MEMS) sensors that are used predominantly for screen control and entertainment applications. These sensors have not been broadly used to date for navigation purposes due to very high noise, large random drift rates, and frequently changing orientations with respect to the carrying platform.

Magnetometers are also found within many mobile devices. In some cases, it has been shown that a navigation solution using accelerometers and magnetometers may be possible if the user is careful enough to keep the device in a specific orientation with respect to their body, such as when held carefully in front of the user after calibrating the magnetometer.

As such, there is a need for a navigation solution capable of accurately utilizing measurements from a device within a platform to determine the navigation state of the device/platform without any constraints on the platform (i.e. in indoor or outdoor environments) or the mobility of the device. The estimation of the position and attitude of the platform should be independent of the usage of the device (e.g. the way the device is put or moving within the platform during navigation). In the above scenarios, the device can be moved or tilted to any orientation within the platform; the device still needs to provide seamless navigation even in such scenarios. This again highlights the key importance of misalignment determination between the device and platform, to enable the device to be used in any orientation with respect to the platform.

Thus methods of mitigating such problems are required for navigation using devices, wherein mobility of the device may be constrained or unconstrained within the platform, and wherein the device may be moved or tilted to any orientation within the platform.

In addition to the above mentioned application of portable devices (that involves a full navigation solution including position, velocity and attitude, or position and attitude), there are other applications (that may include estimating a full navigation solution, or an attitude only solution or an attitude and velocity solution) wherein the method to mitigate the aforementioned problems is needed for enhancing the user experience and usability, and may be applicable in a number of scenarios.

SUMMARY

The present disclosure relates to a method and apparatus for determining the misalignment between a device and a platform (such as for example a vessel or vehicle) using acceleration and/or deceleration of the platform, wherein the device can be strapped (tethered) or non-strapped (non-tethered) to the platform, wherein in case of non-strapped the mobility of the device may be constrained or unconstrained within the platform. In case of non-strapped, the device may be moved or tilted to any orientation within the platform and still provide a seamless navigation solution without degrading the performance of this navigation solution. When the device is in a holder in the platform, it is still considered non-strapped, as it may move with respect to the platform. The sensors have a corresponding frame for the sensors' axes. The misalignment between the device and the platform corresponds to the misalignment between the frame of the sensor assembly in the device and the frame of the platform. The method can utilize measurements (readings) from sensors (such as for example, accelerometers, odometer/wheel encoders, gyroscopes, etc.) whether in the presence or in the absence of navigational information updates (such as, for example, Global Navigation Satellite System (GNSS) or WiFi positioning).

The present method and apparatus can be used to calculate a continuous misalignment angle covering the whole misalignment space, not just discrete or pre-determined values of such angle.

The present method and apparatus can be used to calculate an absolute misalignment angle not a relative one.

In case of non-strapped device within the platform, the present method can work with different device usages and orientations with respect to the platform.

In case of non-strapped device within the platform, the present method and apparatus can be used to calculate an initial misalignment angle between the device and the platform, a continued misalignment angle that may change in run, or both initial and continued misalignment.

In case of strapped device within the platform, the present method and apparatus can be used to calculate the mounting misalignment between the device and the platform.

The method includes the steps of:

a) Detecting acceleration and/or deceleration of the platform. This may be achieved using any one or any combination of: (i) accelerometer readings, (ii) odometer readings, (iii) wheel encoders readings, (iv) absolute navigational information when available, (v) detection of stationary (i.e. static) periods, (vi) an integrated navigation solution of any type, (vii) a smoothed, averaged, or filtered version of anyone or any combination of the above, (viii) a buffered history of anyone or any combination of the above, and/or (ix) a smoothed, averaged, or filtered version of a buffered history of anyone or any combination of the above. In some embodiments, this step is done constantly to check if acceleration or deceleration is detected. In other embodiments, this step may be done when the platform is moving in a straight line.

b) Obtaining the leveled horizontal components of acceleration readings along the forward and lateral axes of the device. This can be obtained through: (i) leveled accelerometer readings, (ii) a buffered history of the leveled accelerometer readings, (iii) a smoothed, averaged, or filtered version of the leveled accelerometer readings, or (iv) a smoothed, averaged, or filtered version of a buffered history of the leveled accelerometer readings.

c) Calculating a misalignment angle between the device and platform using the leveled horizontal components of acceleration readings along the forward and lateral axes of the device when acceleration or deceleration is detected from step a). The calculation of misalignment angle depends on whether it is an acceleration or deceleration.

In case optional detection of stationary (static) periods is used, the detection may depend on anyone or any combination of the following among others: (i) accelerometer readings, (ii) gyroscope readings, (iii) odometer readings, (vi) wheel encoder readings, and/or (v) absolute navigational information when available.

In some embodiments, an optional routine to average, smooth or filter the calculated misalignment angle may be used. In these embodiments any averaging, smoothing, or filtering technique can be used.

In some embodiments, an optional routine to double check if the calculated misalignment angle through the above method is a legitimate one not a noise and protect against such cases may be used.

In some embodiments, an optional routine that combines the misalignment from the method provided herein with one or more other methods for determining the misalignment between a device and a platform or vessel may be used.

Any one or any combination of the above optional routines can be used.

Broadly stated, in some embodiments, a method and apparatus for determining misalignment between a device and a platform using acceleration or deceleration of the platform, wherein the device comprises sensors capable of providing sensor readings, wherein said sensors comprise at least one accelerometer with at least two axes, the method comprising the steps of: a) detecting acceleration or deceleration of the platform; b) obtaining leveled horizontal components of acceleration readings along forward and lateral axes of the device from the accelerometer; and c) calculating a misalignment angle between the device and the platform using the leveled horizontal components of acceleration readings along the forward and lateral axes of the device when acceleration or deceleration is detected.

DESCRIPTION OF EMBODIMENTS

The present invention relates to a method and apparatus for determining the misalignment between a device and a platform (such as for example a vessel or vehicle) using acceleration and/or deceleration of the platform, wherein the device can be strapped (tethered) or non-strapped (non-tethered) to the platform, wherein in case of non-strapped the mobility of the device may be constrained or unconstrained within the platform. In case of non-strapped, the device may be moved or tilted to any orientation within the platform and still provide a seamless navigation solution without degrading the performance of this navigation solution. When the device is in a holder in the platform, it is still considered non-strapped, as it may move with respect to the platform. The sensors have a corresponding frame for the sensors' axes. The misalignment between the device and the platform corresponds to the misalignment between the frame of the sensor assembly in the device and the frame of the platform. This method can utilize measurements (readings) from sensors (such as for example, accelerometers, odometer/wheel encoders, gyroscopes, etc.) whether in the presence or in the absence of navigational information updates (such as, for example, Global Navigation Satellite System (GNSS) or WiFi positioning).

The platform is a motion-capable platform that may be temporarily stationary. Some of the examples of the platforms may be a vehicle or a vessel of any type. The vessel may be land-based, marine or airborne.

The usage of the term acceleration or deceleration herein is understood to be inclusive (not exclusive). When the term acceleration or deceleration is mentioned, acceleration means the platform is accelerating (i.e. the platform speed is becoming higher), while deceleration means the platform is decelerating (i.e. the platform speed is becoming lower). The accelerometer measures specific forces, thus the accelerometer readings comprise specific forces. When the gravity component is removed from the accelerometer readings, they become "acceleration readings". "Acceleration readings" are positive when the platform is accelerating and negative when the platform is decelerating. The leveled horizontal components of acceleration readings are equivalent to the leveled horizontal components of accelerometer readings. The leveled horizontal components of acceleration readings do not contain the gravity, while the leveled vertical component of accelerometer readings contains the gravity.

The device is "strapped", strapped down, or tethered to the platform when it is physically connected to the platform in a fixed manner that does not change with time during navigation. In the case of strapped devices, the relative position and orientation between the device and platform does not change with time during navigation. The device is "non-strapped", or non-tethered when the device has some mobility relative to the platform (or within the platform). This means that the relative position or relative orientation between the device and platform may change with time during navigation. The device may be "non-strapped" in two scenarios: where the mobility of the device within the platform is "unconstrained", or where the mobility of the device within the platform is "constrained". An example where the mobility of the device within the platform is "unconstrained" is a person in a vessel or vehicle, where the person have a portable device such as a smartphone in the their hand for texting or viewing purposes (hand may also move), at their ear, in a belt clip, in a pocket, among others, where such use cases can change with time and even each use case can have a changing orientation with respect to the user. An example of "constrained" mobility may be when the user enters a vehicle and puts the portable device (such as smartphone) in a rotation-capable holder or cradle. In this example, the user may rotate the holder or cradle at any time during navigation and thus may change the orientation of the device with respect to the platform or vehicle.

Absolute navigational information is information related to navigation and/or positioning and are provided by "reference-based" systems that depend upon external sources of information, such as for example Global Navigation Satellite Systems (GNSS). On the other hand, self-contained navigational information is information related to navigation and/or positioning and is provided by self-contained and/or "non-reference based" systems within a device/platform, and thus need not depend upon external sources of information that can become interrupted or blocked. Examples of self-contained information are readings from motion sensors such as accelerometers and gyroscopes.

The present method and apparatus can be used to calculate a continuous misalignment angle covering the whole misalignment space, not just discrete or pre-determined values of such angle.

The present method and apparatus can be used to calculate an absolute misalignment angle not a relative one.

In case of non-strapped device within the platform, the present method can work with different device usages and orientations with respect to the platform.

In case of non-strapped device within the platform, the present method and apparatus can be used to calculate an initial misalignment angle between the device and the platform, a continued misalignment angle that may change in run, or both initial and continued misalignment.

In case of strapped device within the platform, the present method and apparatus can be used to calculate the mounting misalignment between the device and the platform.

It should be noted that the present method can be used in a variety of applications including, without limitations, those that involve a navigation solution including:
    position, velocity and attitude, or
    only position and attitude,
or a partial navigation solution including:
    only attitude and velocity, or
    only attitude.

The device includes sensors capable of providing sensors readings and a processor operative to process the present method. The device includes at least an accelerometer for measuring accelerations or specific forces with at least two axes. Typical devices comprise a tri-axial accelerometer for measuring accelerations or specific forces, along each of the sensitive axis, i.e., the x-axis, y-axis and the z-axis. In some embodiments, the device may contain other sensors such as for example gyroscopes, magnetometers, barometer, among others. In some embodiments, the device may obtain readings from odometer or wheel encoders if available on the platform through a wired or wireless connection. In some embodiments, the device may include a receiver of absolute navigational information such as for example GNSS, WiFi, or both among others.

In case of non-strapped device within the platform, during normal use, the attitude of a device (e.g. portable phone) changes freely. Indeed, such devices often undergo rotational movements along any of their major axes (e.g. the x-axis, y-axis and z-axis). Such axes are defined in FIG. 1, wherein the forward axis of the device is defined as x-axis, the vertical or z-axis is pointing downward and the transversal axis or y-axis is defined in a way to complete the right handed coordinate system.

Figure 1:
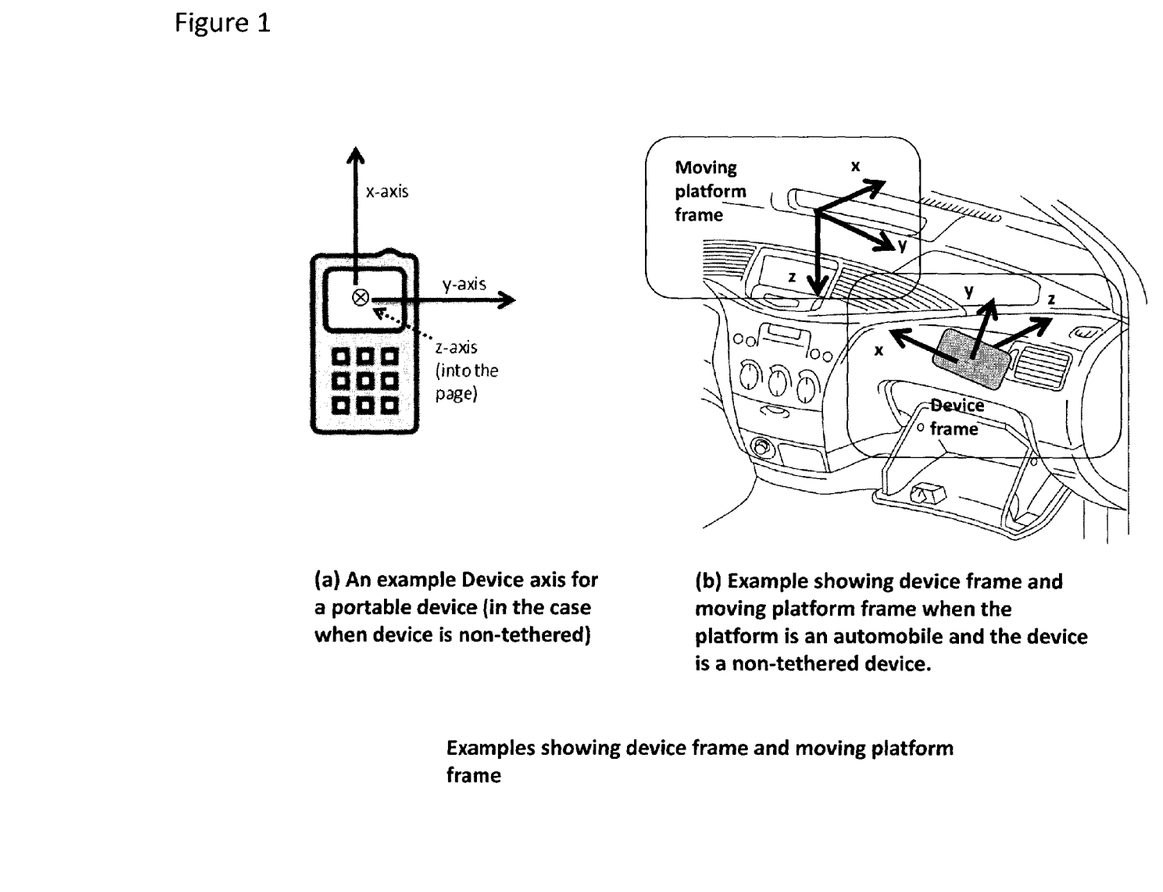
FIG. 1 shows an example of the sensitive axes of the device in the case of a portable non-strapped device (a), and a depiction of one embodiment of misalignment between the device in the case of a portable non-strapped device and the platform, where the platform is a vehicle (b)

In case of non-strapped device within the platform, the orientation of a device within a platform is not representative of the orientation of the platform. The device may undergo any number of rotational movements along any of its major axes, with respect to the platform. These rotational movements of the device do not indicate that the platform is going through the same changes in orientation. For example, the platform may be moving on a leveled 2D plane while the device may be undergoing any number of possible roll and pitch angles. FIG. 1 shows possible relationship between an unconstrained device and an example platfor Roll is defined as the rotation of the device along the forward x-axis, while pitch is the rotation along the lateral y-axis. In case of non-strapped device within the platform, because the device user is free to rotate the device as desired, the device can have several changes in roll, pitch and azimuth (heading) with respect to the platform. In case of strapped device within the platform, the device will have the same relative roll, pitch and azimuth with respect to the platform.

The present method includes the steps of:

a) Detecting acceleration and/or deceleration of the platform. This may be achieved using any one or any combination of: (i) the accelerometer readings, (ii) odometer readings, (iii) wheel encoders readings, (iv) absolute navigational information when available, (v) detection of stationary (i.e. static) periods and whether going to a stationary period or out of a stationary period, (vi) an integrated navigation solution of any type, (vii) a smoothed, averaged, or filtered version of anyone or any combination of the above, (viii) a buffered history of anyone or any combination of the above, and/or (ix) a smoothed, averaged, or filtered version of a buffered history of anyone or any combination of the above. In some embodiments, this step is done all the time by checking if acceleration or deceleration is detected. In other embodiments, this step may be done when the platform is moving in a straight line. If the optional straight line detection is used, it may be detected using the following as examples among others: (i) gyroscope readings, (ii) absolute navigational information when available, (iii) the heading angle obtained from anyone or any combination of gyroscopes, magnetometer, integrated navigation, absolute navigational information, among others, (iv) a smoothed, averaged, or filtered version of anyone or any combination of the above, (v) a buffered history of anyone or any combination of the above, and/or (vi) a smoothed, averaged, or filtered version of a buffered history of anyone or any combination of the above.

b) Obtaining the leveled horizontal components of acceleration readings along the forward and lateral axes of the device. This can be obtained through: (i) the leveled accelerometer readings, (ii) a buffered history of the leveled accelerometer readings, (iii) a smoothed, averaged, or filtered version of the leveled accelerometer readings, or (iv) a smoothed, averaged, or filtered version of a buffered history of the leveled accelerometer readings. In case the accelerometer is not already leveled, pitch and roll angles may be used in leveling the accelerometer readings to obtain the leveled horizontal components of acceleration readings. In this case, the pitch and roll angles may be calculated from any one of the following among others: (i) gyroscopes through any one of different methods such as for example quaternions, (ii) accelerometers readings or averaged accelerometer readings (whether fixed-time average or moving average), (iii) integrated navigation solution using any type of integration technique and integrating different sensors and/or systems such as for example some or all of the following: accelerometers, gyroscopes, magnetometers, barometer, or any navigational information updates (such as, for example, GNSS, WiFi, or any other wireless technique).

c) Calculating a misalignment angle between the device and platform using the leveled horizontal components of acceleration readings along the forward and lateral axes of the device when acceleration or deceleration is detected from step a). The calculation of misalignment angle depends on whether it is an acceleration or deceleration. An example of possible calculation of misalignment angle used in some embodiments is: (i) when acceleration is detected the misalignment angle is $atan2(-accel_{leveled,lateral}, accel_{leveled,forward})$; (ii) when deceleration is detected the misalignment angle is $atan2(accel_{leveled,lateral}, -accel_{leveled,forward})$. The components $accel_{leveled,forward}$ and $accel_{leveled,lateral}$ can be: (i) the leveled horizontal components of acceleration readings along the forward and lateral axes of the device; (ii) a buffered history of the leveled horizontal components of acceleration readings along the forward and lateral axes of the device; (iii) the summation of buffered history of the leveled horizontal components of acceleration readings along the forward and lateral axes of the device; (iv) a smoothed, averaged, or filtered version of the leveled horizontal components of acceleration readings along the forward and lateral axes of the device; or (v) a smoothed, averaged, or filtered version of a buffered history of the leveled horizontal components of acceleration readings along the forward and lateral axes of the device.

In case optional detection of stationary (static) periods is used, the detection may depend on anyone or any combination of the following among others: (i) accelerometer readings, (ii) gyroscope readings, (iii) odometer readings, (vi) wheel encoder readings, and/or (v) absolute navigational information when available.

In some embodiments, an optional routine to average, smooth or filter the calculated misalignment angle may be used. In these embodiments any averaging, smoothing, or filtering technique can be used.

In some embodiments, an optional routine to double check if the calculated misalignment angle through the above method is legitimate (not noise) and protect against such cases may be used.

In some embodiments, an optional routine that combines the misalignment from the method provided herein with one or more other methods for determining the misalignment between a device and a platform or vessel may be used. In some of these embodiments, the combining of the misalignment calculated from different methods can be achieved by using any averaging, smoothing or filtering techniques; an example of filtering technique that may be used is Kalman filtering.

Any one or any combination of the above optional routines can be used.

Figure 2:
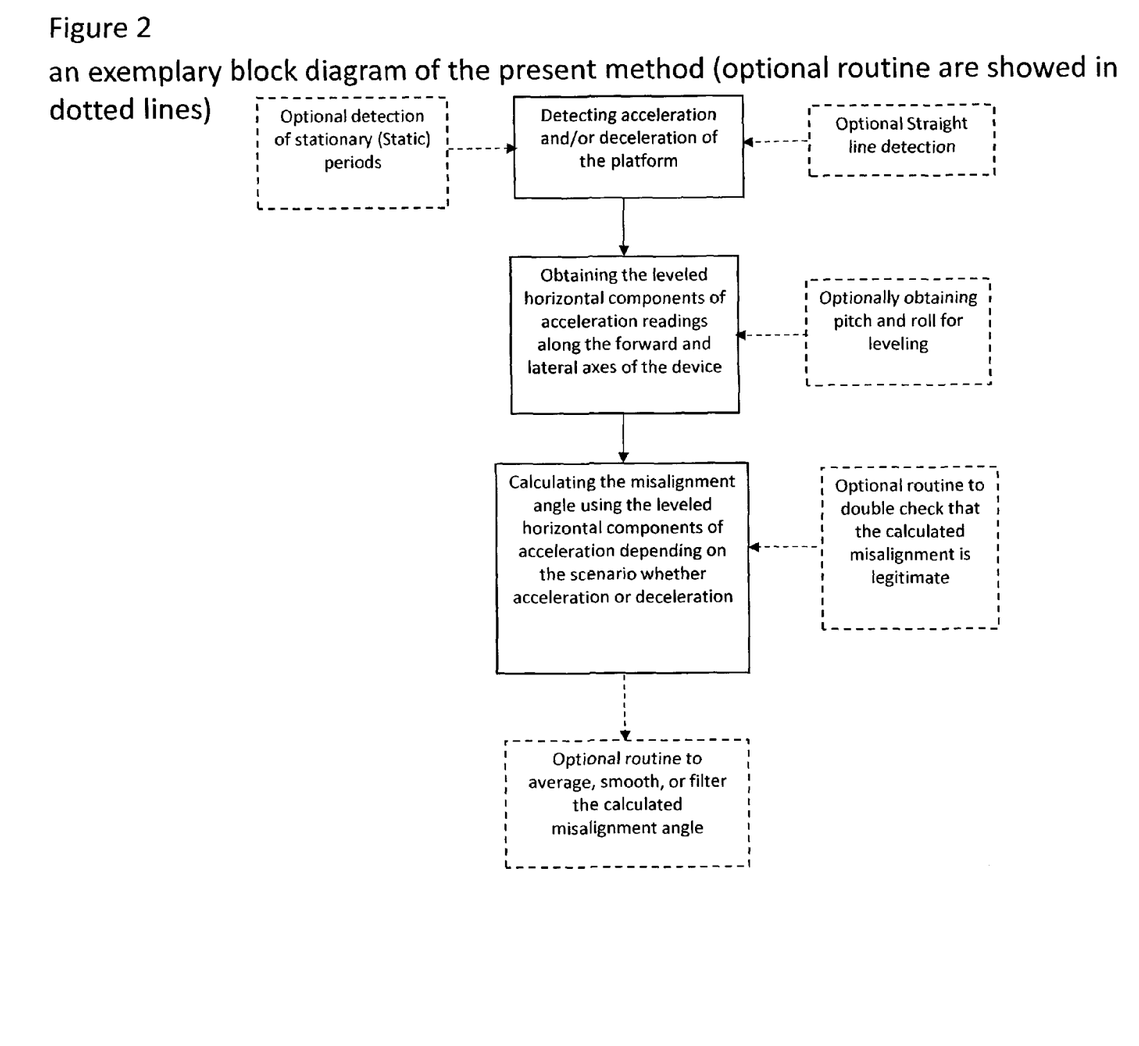
FIG. 2 shows a flow chart of one embodiment of the present method (showing optional methods in boxes having dashed lines).

A block diagram of one embodiment of the method according to the invention is shown in FIG. 2. Optional components of the method are marked with dotted lines and dotted boxes.

The method and apparatus presented herein may be combined with any navigation solution independent of the type of the state estimation or filtering technique used in this navigation solution. The state estimation technique can be linear, nonlinear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example loosely coupled integration scheme or tightly coupled integration scheme among others. The navigation solution may utilize modeling (whether with linear or non-linear, short memory length or long memory length) and/or automatic calibration for the errors of inertial sensors and/or the other sensors used.

The present method may be combined with a mode of conveyance technique or a mode detection technique to establish the mode of conveyance. This enables the discrimination of different scenarios such as for example walking and driving among other possible modes.

Contemplated Embodiments

The present disclosure describes the body frame to be x forward, y positive towards right side of the body and z axis positive downwards. It is contemplated that any body-frame definition can be used for the application of the method and apparatus described herein.

It is contemplated that the method presented above can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that the method presented above can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigational information (e.g. GNSS); the forward integrated navigation solution in the device integrating the available sensors with the absolute navigational information (e.g. GNSS) and possibly with the optional speed or velocity readings; or a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the method presented above can also be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the method presented above can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the method presented above can also be used with a navigation solution that relies on an ultra-tight integration scheme between GNSS receiver and the other sensors' readings.

It is further contemplated that the method presented above can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or Wimax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the method presented above can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

It is contemplated that the method presented above can also be used with various types of inertial sensors, other than MEMS based sensors described herein by way of example.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processor enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

The embodiments in which an exclusive property or privilege is claimed are defined as follows:

1. A method for determining heading misalignment between a device and a platform using acceleration or deceleration of the platform, wherein the device comprises sensors capable of providing sensor readings, wherein said sensors comprise at least one accelerometer with at least two axes, the method comprising the steps of:
    a) detecting acceleration or deceleration of the platform;
    b) obtaining leveled horizontal components of acceleration readings along forward and lateral axes of the device from the accelerometer; and
    c) calculating a heading misalignment angle between the device and the platform using the leveled horizontal components of acceleration readings along the forward and lateral axes of the device when acceleration or deceleration is detected.

2. The method of claim 1, wherein the method is usable in the absence of absolute navigational information.

3. The method of claim 1, wherein the method is usable while absolute navigational information is available.

4. The method of claim 1, wherein detecting acceleration or deceleration is performed continually.

5. The method of claim 1, wherein the device further comprises means to calculate heading angle, and wherein detecting acceleration or deceleration is performed when the platform is moving in a straight line.

6. The method of claim 1, wherein detecting acceleration or deceleration uses the accelerometer readings.

7. The method of claim 1, wherein the platform comprises an odometer capable of providing odometer readings, and wherein the readings are transmitted to the device through a wired or wireless connection, and wherein detecting acceleration or deceleration uses the odometer readings.

8. The method of claim 1, wherein the platform comprises wheel encoders capable of providing wheel encoders readings, and wherein the readings are transmitted to the device through a wired or wireless connection, and wherein detecting acceleration or deceleration uses the wheel encoders readings.

9. The method of claim 1, wherein the device comprises a receiver to receive absolute navigational information, and wherein detecting acceleration or deceleration uses the absolute navigational information.

10. The method of claim 1, wherein the device comprises means to detect static periods, and wherein detecting acceleration or deceleration uses the static period detection.

11. The method of claim 1, wherein the device comprises means to run an integrated navigation solution, and wherein detecting acceleration or deceleration uses the integrated navigation solution.

12. The method in any one of claim 6, 7, 8, 9, 10, or 11, wherein detecting acceleration or deceleration uses a buffered history of any one or any combination of the used values.

13. The method in any one of claim 6, 7, 8, 9, 10, 11, or 12, wherein detecting acceleration or deceleration uses a smoothed version of any one or any combination of the used values.

14. The method in any one of claim 6, 7, 8, 9, 10, 11, 12, or 13, wherein detecting acceleration or deceleration uses any one or any combination of the used values.

15. The method in claim 13, wherein the smoothing is obtained through one of the following techniques: (i) averaging techniques, or (ii) filtering techniques.

16. The method of claim 5, wherein the device comprises means to detect static periods, and wherein the detection of static periods uses the accelerometer readings.

17. The method of claim 10, wherein the device comprises a gyroscope sensor capable of providing gyroscope readings, and wherein the detection of static periods uses the gyroscope readings.

18. The method of claim 10, wherein the platform comprises an odometer capable of providing odometer readings, and wherein the readings are transmitted to the device through a wired or wireless connection, and wherein the detection of static periods uses the odometer readings.

19. The method of claim 10, wherein the platform comprises wheel encoders capable of providing wheel encoders readings, and wherein the readings are transmitted to the device through a wired or wireless connection, and wherein the detection of static periods uses the wheel encoders readings.

20. The method of claim 10, wherein the device comprises a receiver to receive absolute navigational information, and wherein the detection of static periods uses the absolute navigational information.

21. The method in claim 1, wherein obtaining the leveled horizontal components of acceleration readings along the forward and lateral axes of the device comprises one of the following: (i) the leveled accelerometer readings, (ii) a buffered history of the leveled accelerometer readings, (iii) a smoothed version of the leveled accelerometer readings, or (iv) a smoothed version of a buffered history of the leveled accelerometer readings.

22. The method in claim 21, wherein the accelerometer is mounted in a leveled orientation.

23. The method in claim 21, wherein the accelerometer is not mounted in a leveled orientation, and wherein the device comprises means to calculate pitch and roll angles, wherein the pitch and roll angles are used in leveling the accelerometer readings to obtain the leveled horizontal components of acceleration readings.

24. The method in claim 23, wherein the pitch and roll angles are calculated using the accelerometer readings or averaged accelerometer readings.

25. The method in claim 23, wherein the device comprises a gyroscope sensor capable of providing gyroscope readings, and wherein the pitch and roll angles are calculated using the gyroscope readings.

26. The method in claim 23, wherein the device comprises means to run an integrated navigation solution, and wherein the pitch and roll angles are calculated using the integrated navigation solution.

27. The method in claim 1, wherein calculating the heading misalignment angle between the device and platform uses one of the following: (i) the leveled horizontal components of acceleration readings along the forward and lateral axes of the device; (ii) a buffered history of the leveled horizontal components of acceleration readings along the forward and lateral axes of the device; (iii) the summation of buffered history of the leveled horizontal components of acceleration readings along the forward and lateral axes of the device; (iv) a smoothed version of the leveled horizontal components of acceleration readings along the forward and lateral axes of the device; or (v) a smoothed version of a buffered history of the leveled horizontal components of acceleration readings along the forward and lateral axes of the device.

28. The method in any one of claim 1, 21, 23, or 27, wherein the method further comprises averaging, smoothing or filtering the calculated heading misalignment angle.

29. The method in any one of claim 1, 21, 23, 27, or 28, wherein the method further comprises checking whether the detected heading misalignment change is correct.

30. The method in claim 29, wherein the method further comprises checking if the detected heading misalignment change is noise and protecting against the heading misalignment change if it is noise.

31. The method in any one of claim 1, 21, 23, 27, 28, or 29, wherein the method further comprises combining the determined heading misalignment with other techniques for determining the heading misalignment between the device and the platform.

32. The method in any one of claim 1, 21, 23, 27, 28, 29, or 31, wherein the device is moveable within the platform, the determined heading misalignment is one of the following: (i) an initial heading misalignment angle between the device and the platform, (ii) a continued heading misalignment angle that can change in run, or (iii) both an initial heading misalignment angle between the device and the platform and a continued heading misalignment angle between the device and the platform.

33. The method in any one of claim 1, 21, 23, 27, 28, 29, or 31, wherein the device is fixed within the platform, the present method can be used to calculate the mounting heading misalignment between the device and the platform.

34. A device having constrained or unconstrained mobility within a platform, the device comprising:
   a. sensors capable of providing sensor readings, wherein said sensors comprise at least one accelerometer with at least two axes; and
   b. at least one processor, coupled to receive readings from the sensors, and operative to determine a heading misalignment between the device and the platform, wherein the processor is operative to:
   i) detect acceleration or deceleration of the platform;
   ii) obtain leveled horizontal components of acceleration readings along forward and lateral axes of the device from the accelerometer; and
   iii) calculate the heading misalignment angle between the device and platform using the leveled horizontal components of acceleration readings along the forward and lateral axes of the device when acceleration or deceleration is detected.

35. The device of claim 34, wherein the processor operates in the absence of absolute navigational information.

36. The device of claim 34, wherein the processor operates while absolute navigational information is available.

* * * * *